(12) United States Patent
Won et al.

(10) Patent No.: US 10,152,471 B2
(45) Date of Patent: Dec. 11, 2018

(54) METHOD FOR PERFORMING NORMALIZATION OF UNSTRUCTURED DATA AND COMPUTING DEVICE USING THE SAME

(71) Applicant: Seculayer Co., Ltd., Seoul (KR)

(72) Inventors: Jong Seoung Won, Seoul (KR); Jin Sang Ryu, Seoul (KR)

(73) Assignee: Seculayer Co., Ltd., Seoul (KR)

( * ) Notice: Subject to any disclaimer, the term of this patent is extended or adjusted under 35 U.S.C. 154(b) by 0 days.

(21) Appl. No.: 15/514,925

(22) PCT Filed: Nov. 11, 2016

(86) PCT No.: PCT/KR2016/013044
§ 371 (c)(1),
(2) Date: Mar. 28, 2017

(87) PCT Pub. No.: WO2017/188534
PCT Pub. Date: Nov. 2, 2017

(65) Prior Publication Data
US 2018/0137095 A1    May 17, 2018

(30) Foreign Application Priority Data
Apr. 26, 2016  (KR) .......................... 10-2016-0051087

(51) Int. Cl.
*G06F 17/30* (2006.01)
*G06F 17/27* (2006.01)

(52) U.S. Cl.
CPC .......... *G06F 17/2705* (2013.01); *G06F 17/30* (2013.01); *G06F 17/30371* (2013.01); *G06F 17/30613* (2013.01)

(58) Field of Classification Search
CPC ......... G06F 17/30637; G06F 17/30666; G06F 17/30557; G06F 17/30613; G06F 17/30371; G06F 17/2705
See application file for complete search history.

(56) References Cited

U.S. PATENT DOCUMENTS 7,792,814 B2 *  9/2010  Cohen ............... G06F 17/30985
                                                    707/707
8,484,230 B2 *  7/2013  Harnett ............. G06F 17/30637
                                                    707/755
(Continued)

FOREIGN PATENT DOCUMENTS

KR    10-2001-0075848 A    8/2001
KR    10-0631086 B1        10/2006
KR    10-1012335 B1        2/2011

*Primary Examiner* — Cheryl Lewis
(74) *Attorney, Agent, or Firm* — Husch Blackwell LLP (57) ABSTRACT

A method for performing normalization of at least one piece of unstructured data is provided. The method includes steps of: (a) a computing device parsing or supporting other device to parse at least some unstructured data under a parsing rule; (b) the computing device selecting or supporting other device to select item names corresponding to individual fields extracted from the unstructured data through the parsing and verifying or supporting other device to verify a validity of data types corresponding to the individual fields; (c) the computing device creating or supporting other device to create information on transformation of the unstructured data by referring to the item names and the data types and transforming or supporting other device to transform the unstructured data based on the information; and (d) the computing device creating or supporting other device to create a program code for the normalization based on the information.

35 Claims, 5 Drawing Sheets

(56) References Cited

U.S. PATENT DOCUMENTS

2006/0288268 A1* 12/2006 Srinivasan ............ G06F 17/245
715/210
2007/0078872 A1* 4/2007 Cohen ............... G06F 17/30696
2011/0066585 A1* 3/2011 Subrahmanyam ..... G06N 7/005
706/52

* cited by examiner

METHOD FOR PERFORMING NORMALIZATION OF UNSTRUCTURED DATA AND COMPUTING DEVICE USING THE SAME

CROSS REFERENCE TO RELATED APPLICATIONS

This application is a U.S. National Phase Application of International Application No. PCT/KR2016/013044 filed on Nov. 11, 2016, which claims the benefit of priority from Korean Patent Application 10-2016-0051087 filed on Apr. 26, 2016. The disclosures of International Application No. PCT/KR2016/013044 and Korean Patent Application 10-2016-0051087 are incorporated herein by reference.

FIELD OF THE INVENTION

The present invention relates to a method for supporting normalization of unstructured data and a computing device using the method; and more particularly, the method for (a) parsing or supporting other device to parse at least some unstructured data under a parsing rule, (b) selecting or supporting other device to select names of items corresponding to individual fields extracted from the unstructured data through the parsing and verifying or supporting other device to verify a validity of data types corresponding to the individual fields, (c) creating or supporting other device to create information on transformation of the unstructured data by referring to the names of the items and the data types and transforming or supporting other device to transform the unstructured data based on the information on the transformation; and (d) creating or supporting other device to create program code for the normalization based on the information on the transformation; and the computing device using the same.

BACKGROUND OF THE INVENTION

In general, devices that provide services using networks record log files including logs corresponding to individual services, and logs about service operation are stored in such log files. Individual services may have a variety of forms of logs. In the present specification, unstructured data refer to such types of logs because they do not have any consistent form. In addition, the unstructured data in the specification are not limited to text data but may include at least either of text data and binary data. In a Table 1 shown below, an example in a text form is provided as an example of the unstructured data.

TABLE 1

<Unstructured text example 1 - Bro IDS log>1351145805.760024 zPnv2YKLHqf 192.168.1.26 58349 114.108.1.2 80 unescaped_special_URI_char - F< Unstructured text example 2 - SecuiNXG log><214>[LOG_DENIED] id=firewall time="2014-03-22 p.m. 11:22:33" fw=nxg500.naver.com pri=6 rule=1 src=210.226.11.212 dst=192.168.1.100 proto=443/tcp src_port=9080 dst_port=80 act=DENY msg="Count=1 Interface=External"

If the aforementioned unstructured data were stored, a user cannot know what individual items mean and cannot analyze them easily. Therefore, it is necessary to extract individual fields to put them in a common form and convert a result of extraction to a structured form. This is referred to as normalization of the unstructured data and examples of the structured data as results of normalizing the above-described unstructured data are as shown in a table 2 below.

TABLE 2

| Name of field | Result of normalization of example 1 | Result of normalization of example 2 |
|---|---|---|
| Log generation time | 2012-10-25 15:16:45 | 2014-03-22 23:22:33 |
| Source IP | 192.168.1.26 | 210.226.11.212 |
| Source port | 58349 | 9080 |
| Destination IP | 114.108.1.2 | 192.168.1.100 |
| Destination port | 80 | 443 |
| Protocol | — | TCP |

In the past, there were mainly two methods used to normalize the unstructured data. The first method was for a program developer to individually code for each of unstructured data formats which have different types (by using a programming language) and the second method was to normalize the unstructured data by directly defining meta information, i.e., information necessary to understand the unstructured data, in a form of code including XML, etc.

In the first one, it is almost impossible for a common user who is not familiar with a programming language to normalize the unstructured data, and even a professional developer may need much time to normalize the data.

The second method, which solves a shortcoming of the first method to some degree, is comprised mainly of two steps of preprocessing and analysis. The preprocessing step is a step of parsing the unstructured data and then displaying a field value as the result to the user, and the analysis step is a step of coding a format-converting rule where the user determines a field name by reading the result and analyzing a meaning and analyzes and normalizes the type of the field value into a uniform structure. These conventional methods are problematic as the user himself/herself must program the code at each step. If a field is extracted through a separator or a regular expression directly designated by the user at the conventional preprocessing step, the user reads it and defines a name of an item corresponding to the field at the step of analysis. In addition, the user cannot immediately know how data are converted by the parsing at the preprocessing step, and is only able to check them after storing them. Besides, since the user can check whether a data type is proper only after they are stored and the user may change the data type only then, a response to this problem is slow.

The present inventor, therefore, intends to propose a universal method for automatically normalizing unstructured data and a system using the method, which are easy to use for a user who is not a developer.

SUMMARY OF THE INVENTION

It is an object of the present invention to solve the aforementioned problems.

It is another object of the present invention to provide a configuration of a computing device automatically parsing even if a user does not take any direct action at a step of preprocessing.

It is still another object of the present invention to provide a configuration of the computing device determining an item name of a field by analyzing a meaning of the field and determining a data type even at a step of analysis.

It is still yet another object of the present invention to automatically create information on transformation of unstructured data based on a result of analysis after the step of analysis and create a code for normalizing multiple unstructured data by using the information on the transformation.

BRIEF DESCRIPTION OF THE DRAWINGS

Drawings necessary to be used to explain embodiments to show technical solutions more clearly in embodiments of the present invention will be described briefly. Clearly, the drawings presented as shown below are just part of the embodiments of the present invention and other drawings will be able to be obtained based on the drawings without inventive work for those skilled in the art.

DETAILED DESCRIPTION OF THE PREFERRED EMBODIMENTS

To make clear of the objects of the present invention, technical solutions and benefits, detailed description of embodiments in which the invention may be practiced will be discussed by referring to attached drawings. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed partially from the specification and partially from the implementation of the present invention. The following examples and drawings will be provided as examples but they are not intended to limit the present invention:

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Unless otherwise indicated in the specification or clearly contradicted in the context, an item indicated in the singular includes those in the plural, unless otherwise required in the context. These embodiments will be described in sufficient detail by referring to attached drawings regarding the embodiments of the present invention to enable those skilled in the art to practice the invention.

Figure 1:
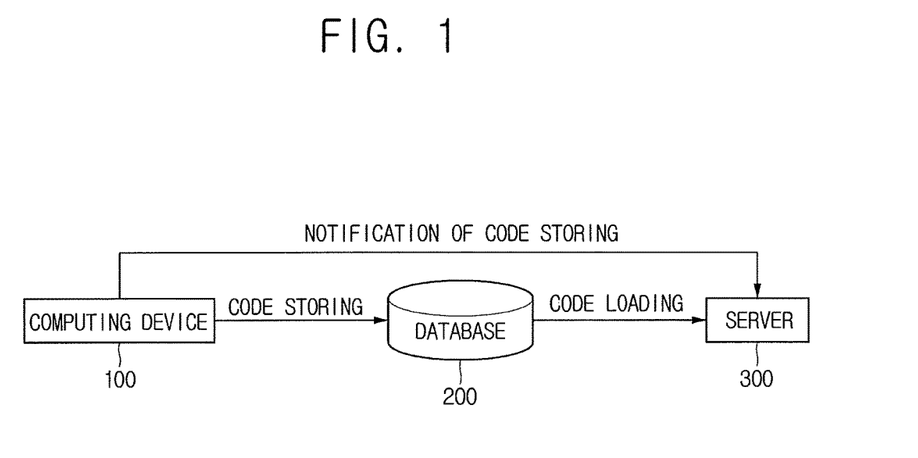
FIG. 1 is a concept diagram roughly illustrating an exemplary configuration to apply a method for supporting normalization of unstructured data in accordance with one example embodiment of the present invention.

FIG. 1 is a concept diagram schematically illustrating a computing device 100, a database 200, and a server 300 as an exemplary configuration to apply a method for normalizing unstructured data in accordance with one example embodiment of the present invention.

Figure 2:
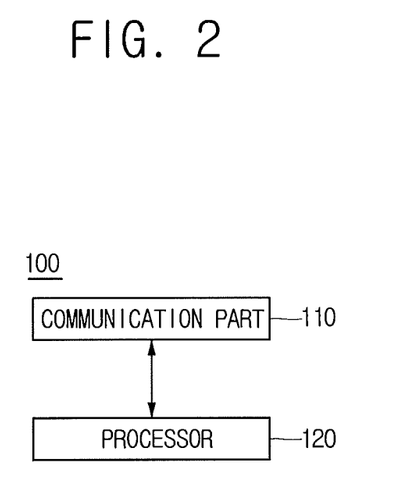
FIG. 2 is a block diagram exemplarily illustrating a computing device which performs a method for supporting the normalization of unstructured data in accordance with one example embodiment of the present invention.

By referring to FIG. 1, the computing device 100 may be connected with the database 200 through wired or wireless connection of a communication part 110 in FIG. 2. In addition, the computing device 100 may be connected with the server 300 through the wired or wireless connection of the communication part 110. The server 300 may be connected with the database 200.

For example, it will be understood by those skilled in the art that the computing device 100 may be a wireless network client, a desktop computer, a laptop, a mobile device, a mobile phone, a PDA or any other terminal device but it is not limited to these.

As a system configured to normalize multiple unstructured data according to a code created by the computing device 100, the server 300 achieves desired system functions typically by using a combination of computer hardware and computer software. The server 300 may be at least one clustered machine.

FIG. 2 is a block diagram exemplarily showing the computing device 100 that performs a method for supporting normalization of unstructured data in accordance with one example embodiment of the present invention.

By referring to FIG. 2, the computing device 100 may include the communication part 110 and a processor 120.

More specifically, the communication part 110 may acquire unstructured data as a subject of normalization. In accordance with one example embodiment, the communication part 110 may also notify the server 300 that a code for normalization in accordance with the present invention has been delivered to the database 200.

Besides, to normalize the unstructured data acquired through the communication part 110, the processor 120 may perform a normalization method, i.e., a method for supporting the normalization of unstructured data, as shown below in accordance with the present invention.

Figure 3:
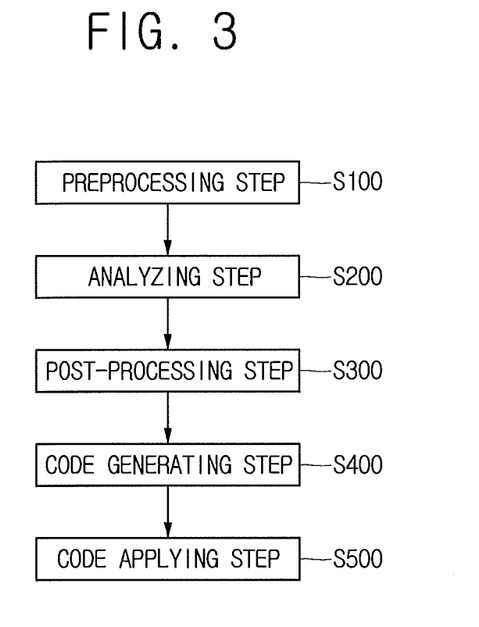
FIG. 3 is a flowchart exemplarily showing a method for supporting the normalization of unstructured data in accordance with one example embodiment of the present invention.

FIG. 3 is a flowchart exemplarily showing a method for supporting the normalization of unstructured data in accordance with one example embodiment of the present invention.

By referring to FIG. 3, the method for supporting the normalization of unstructured data in accordance with the present invention includes a preprocessing step as a S100, i.e., a step of the computing device 100 parsing or supporting other device to parse at least some of unstructured data based on a parsing rule. Preferably, the parsing rule may be expressed as a separator or a regular expression. The parsing rule may be defined by a user but it is not limited to this.

As one example, at the preprocessing step S100, if it is detected that the at least some unstructured data correspond to a predefined format, the computing device 100 may determine or support other device to determine the parsing rule based on the corresponding format, and parse or support other device to parse the at least some unstructured data under the determined parsing rule to extract individual fields. Herein, the predefined format may include at least one of JavaScript Object Notation (JSON), Character Encoding Form (CEF), Key & Value, and Comma-Separated Values (CSV), but it is not limited to these. A Table 3 below is an example of unstructured data corresponding to a format Key & Value.

TABLE 3

EventName="netbios nt null session" SigIndex=465
Severity=Low
Time="2013/01/01 02:38:51" Protocol=TCP
AttackerIP=192.168.1.92
AttackerPort=28563 VictimIP=192.168.1.6 VictimPort=139
Count=1 PktCount=1
Pattern="....W.i.n.d.o.w.s. .N.T. .1.3.8.1" Direct=Outbound
SensorIP=10.136.2.23

At the preprocessing step S100, if the at least some unstructured data are not detected as corresponding to the predefined format, the computing device 100 may perform or support other device to perform a process of determining the parsing rule by referring to the unstructured data, and parse or support other device to parse the at least some unstructured data under the determined parsing rule to extract the individual fields.

In accordance with one example embodiment of the present invention, the process of determining the rule may include calculating statistics of special characters from a result of splitting at least some character strings of unstructured data by a certain unit of length and determining a separator to be included in the parsing rule based on the statistics. In detail, the statistics of the special characters may include at least one piece of information on a distribution thereof and frequency thereof. Herein, at least one special character which has a highest value of the statistics may be determined as the separator.

In accordance with another example embodiment of the present invention, the process of determining the rule may include determining the regular expression. As one example, if at least one character string included in the unstructured data is X0 and if total n results which represent results of separating the character string by the separator are Xk (k=1, 2, . . . , n), individual regular expressions belonging to a regular expression set may be applied to individual Xi (i=0, 1, . . . , n) and at least one specific regular expression corresponding to at least one of the X is may be determined as the regular expression included in the parsing rule by referring to a matched result acquired by an application of the regular expressions.

Herein, the regular expression set may be a regular expression set by item name which is a set of predefined regular expressions corresponding to predefined names of items. For example, if one of X is is Sep. 28, 1981 11:48:00, it may be matched with the regular expression "\d{4}-\d{2}-\d{2}\s\d{2}:\d{2}:\d{2}" which belongs to the set of predefined regular expressions and corresponds to an item name "datetime". In this case, the regular expression "\d{4}-\d{2}-\d{2}\s\d{2}:\d{2}:\d{2}" may be determined as the regular expression to be included in the parsing rule.

In addition, at the preprocessing step S100, the computing device may further perform a process of displaying or supporting other device to display to the user a separated state of the unstructured data as a result of the parsing.

By referring to FIG. 3 again, the method for supporting the normalization of unstructured data in accordance with the present invention further includes an analyzing step S200 of the computing device 100 selecting or supporting other device to select the names of items corresponding to the individual fields extracted from the unstructured data through the parsing, and verifying or supporting other device to verify a validity of data types corresponding to the individual fields.

As one example of selecting or supporting other device to select the names of items corresponding to the individual fields at the step S200, in case the at least some unstructured data are parsed as the individual fields under the parsing rule determined based on the aforementioned predefined format and if the predefined format includes a field name corresponding to at least one field among parsed fields, the computing device 100 may select or support other device to select a name of an item of the at least one field by referring to the field name. For example, as the unstructured data in the Table 3 above have a predefined format Key & Value, "Jan. 1, 2013 02:38:51" among the parsed fields has "Time" as a corresponding field name. Thus, by referring to the field name, the name of an item corresponding to the field could be selected as "time", etc.

As another example of selecting or supporting other device to select the name of an item corresponding to the field at the step S200, if at least some unstructured data are parsed as individual fields under the parsing rule including the regular expressions belonging to a set of regular expressions by item names, the computing device 100 may select or support other device to select the names of items of the parsed fields by referring to the names of items corresponding to the set of regular expressions by item names. As shown in the aforementioned examples, if one of X is is Sep. 28, 1981 11:48:00, the regular expression "\d{4}-\d{2}-\d{2}\s\d{2}:\d{2}:\d{2}" may be included in the parsing rule. Because it belongs to the set of predefined regular expressions corresponding to the item name "datetime", the item name of Sep. 28, 1981 11:48:00 could be selected as "datetime," "DateTime," "time," etc.

Figure 4:
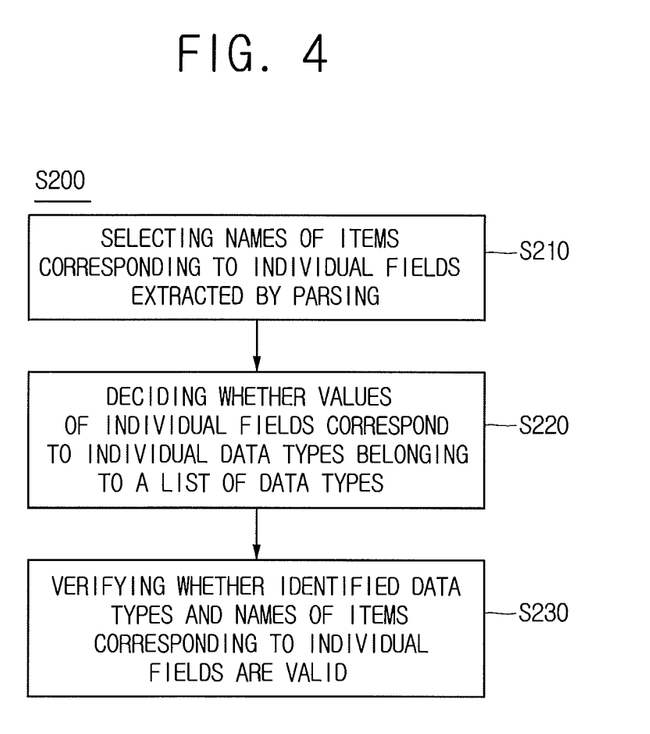
FIG. 4 is a flowchart specifically showing a step of analysis in a method for supporting the normalization of unstructured data in accordance with one example embodiment of the present invention.

Next, FIG. 4 is a flowchart specifically showing an example embodiment specifying a step S200 of analysis in a method for supporting the normalization of unstructured data in accordance with the present invention.

By referring to FIG. 4, the step S200 may include: a step S210 of the computing device 100 selecting or supporting other device to select the names of items corresponding to the individual fields; a step S220 of the computing device 100, if the names of items corresponding to the individual fields are selected, deciding or supporting other device to decide whether values of the individual fields correspond to individual data types belonging to a list of data types; and a step S230 of the computing device 100, if the data types of the values of the individual fields are identified by the decision of S220, verifying or supporting other device to verify whether the identified data types and the names of items corresponding to the individual fields are valid. At the steps S220 and S230, at least either of the names of items corresponding to the individual fields and the data types corresponding to the individual fields may be selected by the user but they are not limited to these.

As one example, the list of data types, herein, may be a predefined list according to the names of items corresponding to the individual fields. For example, a list of data types corresponding to the item name "port number" may be {uint16_t}. It is because the port numbers have a range of 0 to 2^16.

Clearly, several data types may be included in the list of data types. Herein, it may be sequentially decided to which data type a specific value of a field corresponds. Taking an example of a case in which the list of data types is {uint16_t, uint32_t, uint64_t}, if a value of a specific field is 85537, the value is outside a numerical range of uint16_t. Therefore, it could be decided that it does not correspond to a data type uint16_t. After that, in case whether the value belongs to the numerical range of uint32_t or not is determined, it could be decided that 85537 corresponds to the data type uint32_t since 85537 is within the numerical range of uint32_t.

As another example, if a specific item name of the field is selected by referring to the field name included in the predefined format, the list of data types may be the predefined list according to the predefined format and field names. For example, the list of data types {string, long int, double} corresponding to a specific XML format and the field name "DateTime" may be already defined. In this case, if the value of the field name "DateTime" among the unstructured data in the specific XML format is Mar. 22, 2014 11:22:33 p.m., the value may be decided to correspond to a data type 'string' and in case of 1351145805.760024, it may be decided to correspond to a data type 'double'.

In addition, by referring to FIG. 3, the method for supporting the normalization of unstructured data in accordance with the present invention further includes a post-processing step S300 of the computing device 100 creating or supporting other device to create information on transformation of the unstructured data by referring to the names of items and the data types, and transforming or supporting other device to transform the unstructured data based on the information on the transformation.

Herein, the information on the transformation refers to information containing rules for transforming formats of the individual fields to structured ones. The information on the transformation may include at least one piece of transformation option information and transformation function information, but it is not limited to this. Herein, the transformation option information may be information defining a preset transformation method. In addition, the transformation function information, which defines functions that can be applied to the values of the individual fields, may include at least one of: set( ) as a function of setting a random value, replace( ) as a function of replacing a normal character string, replaceAll( ) as a function of replacing character strings by using regular expressions, replaceGet( ) as a function of extracting a character string by using a regular expression, substr( ) as a function of extracting some character strings, date( ) as a function of transforming a date format, hexToString ( ) as a function of converting a hexadecimal character string to a normal character string, stringToMD5( ) as a function of hashing a character string by using md5, unixTimestamp( ) as a function of converting Unix date format, decodeBase64( ) as a function of decoding a Base64 character string to a normal character string, longToIP( ) as a function of converting a long type value to an IP (Internet protocol) address, toLowerCase( ) as a function of changing an upper case letter included in a character string to a lower case letter, and trim( ) as a function of removing leading and trailing spaces of a character string. Table 4 below shows examples of transformation functions.

TABLE 4

| Transformation Function | Description |
| --- | --- |
| set('aaa') | Sets a random value (aaa). |
| replace('a','b') | replaces a character string |

TABLE 4-continued

| Transformation Function | Description |
| --- | --- |
|  | a to a character string b. |
| replaceAll('a','b') | Replaces a character string a to a character string b by using regular expressions. |
| replaceGet('a','b') | Extracts character strings in parentheses in a regular expression by using the regular expression. |
| substr('8') | Extracts a remaining character string beginning at the 8$^{th}$ place. |
| substr ('2','4') | Extracts a character string from the second place to the fourth place. |
| date('a','b') | Transforms a-type date format to b-type format. |
| unixTimestamp( ) | Converts Unix date format to a yyyyMMddHHmmss-type character string. |
| hexToString( ) | Converts a hexadecimal character string to a normal character string. |
| stringToMD5( ) | Hashes a character string using MD5. |
| decodeBase64('a','b') | Decodes a Base64 character string to a normal character string. |
| longToIP( ) | Converts a long type value to an IP address (e.g., 192.168.1.1). |
| toLowerCase( ) | Changes an upper case letter included in a character string to a lower case letter. |
| ifNull('a') | If the field value is null, sets it as a. |
| trim( ) | Removes leading and trailing spaces of a field value. |
| copy('0') | Copies the value of a first field. |
| compare('0','1','true','false') | If the value of a first value and that of a second value are same, returns true and if not, returns false. |
| originalLog( ) | Adds unstructured data as an original from before normalization. |

For example, as the date( ) function has 'yyyy-MM-dd a HH:mm:ss' as a first parameter and 'yyyyMMddHHmmss' as a second parameter, a date character string such as Apr. 4, 2016 p.m. 02:13:01 may be transformed into a structured type such as 20160414141301.

In addition, the information on the transformation may be, defined by using a format tag such as [[function name (parameter 1, parameter 2, . . . )]] or be defined to make the transformation function applied in order by consecutively describing information on several transformation functions as [[function name 1 (parameter 1, parameter 2, . . . )]][[function name 2 (parameter 1, parameter 2, . . . )]].

Figure 5:
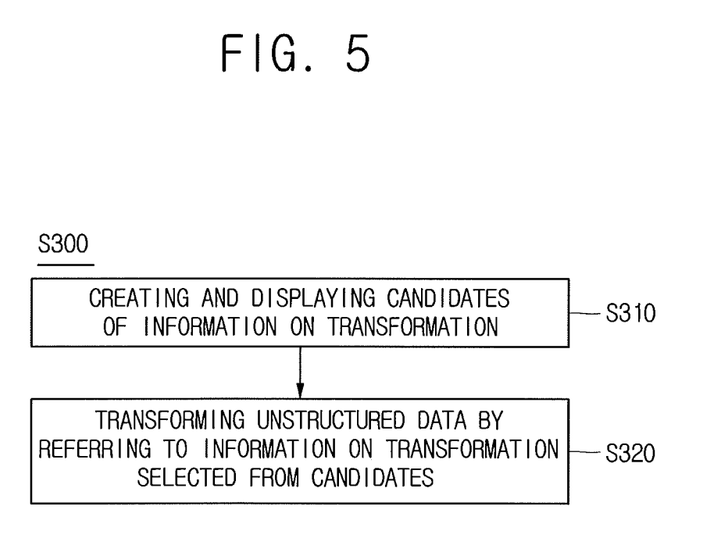
FIG. 5 is a flowchart specifically showing a step of post-processing in a method for supporting the normalization of unstructured data in accordance with one example embodiment of the present invention.

FIG. 5 is a flowchart representing one example embodiment specifying the step S300 of the method for supporting the normalization of unstructured data in accordance with the present invention.

By referring to FIG. 5, the step S300 may include a step S310 of the computing device 100 creating or supporting other device to create candidates of the information on the transformation by referring to the names of items and the types of data and displaying or supporting other device to display the created candidates to the user; and a step S320 of the computing device 100, if the information on the transformation is detected to be selected among the created candidates, transforming or supporting other device to transform the unstructured data by referring to the information on the transformation.

By referring to FIG. 3 again, the method for supporting the normalization of unstructured data in accordance with the present invention further includes a code generating step S400 of the computing device 100 creating or supporting other device to create a program code for the normalization based on the information on the transformation.

This code may be an executable code in a programming language interpreted or compiled by the computing device 100 or the server 300, or a code interpreted by a program run by the computing device 100 or the server 300. As an example of the latter, it may be a code in XML. For reference, in an example of configuration illustrated in FIG. 1, the server 300 which has a function of executing the code is additionally provided, separate from the computing device 100 which has a function of creating the code. A method for configuring the code corresponding to the information on the transformation as explained above may be known to, or easily understood by, those skilled in the art.

Besides, by referring to FIG. 3, the method for supporting the normalization of unstructured data in accordance with the present invention may still include a code applying step S500 of the computing device 100 delivering the created code to the database 200 and instructing the database 200 to store the created code and normalizing or supporting a server 300 connected with the database 200 to normalize at least part of the unstructured data according to the created code.

At the step S500, the computing device 100 may also notify the server 300 that the created code has been delivered to the database 200. Such notification may cause the server 300 to acquire the created code from the database 200 or the computing device 100.

Over all the aforementioned example embodiments, a common user may extract desired information quickly from the unstructured data by an easy normalization of the unstructured data without taking difficult action such as programming coding.

The benefits of the technology explained in the example embodiments include: that the computing device may analyze a meaning of a field by referring to unstructured data and determine an item name of the field, that it may provide a configuration of deciding a data type, and that information on transformation of the unstructured data may be automatically created based on a result of analysis, and that a code which may normalize multiple unstructured data may be created by using the information on the transformation.

Based on the explanation of the example embodiments, those skilled in the art may clearly understand that the present invention may be achieved with a combination of software and hardware or only with hardware. The embodiments of the present invention as explained above can be implemented in a form of executable program commands through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case. The hardware device may include a processor such as CPU or GPU configured to be combined with a memory such as ROM or RAM to store program commands and run the commands stored in the memory and a communication part for transmitting and receiving signals to and from external devices. In addition, the hardware device may include a keyboard, a mouse, or other external input apparatus to receive commands prepared by developers.

As seen above, the present invention has been explained by specific matters such as detailed components, limited embodiments, and drawings. While the invention has been shown and described with respect to the preferred embodiments, it, however, will be understood by those skilled in the art that various changes and modification may be made.

Accordingly, the thought of the present invention must not be confined to the explained embodiments, and the following patent claims as well as everything including variants equal or equivalent to the patent claims pertain to the category of the thought of the present invention.

What is claimed is:

1. A method for performing normalization of at least one piece of unstructured data, comprising steps of:
   (a) a computing device determining whether a predetermined parsing rule is applicable to at least some of the unstructured data;
      (a1) where the predetermined parsing rule is determined to be applicable to at least some of the unstructured data, the computing device parsing or supporting other device to parse at least some unstructured data under the parsing rule to extract individual fields
      (a2) where the predetermined parsing rule is determined not to be applicable to at least some of the unstructured data, the computing device performs or supports other device to perform a process of determining a new parsing rule by referring to the unstructured data, and parses or supports other device to parse the at least some unstructured data under the new parsing rule to extract the individual fields;
   (b) the computing device selecting or supporting other device to select names of items corresponding to individual fields extracted from the unstructured data through the parsing and verifying or supporting other device to verify a validity of data types corresponding to the individual fields;
   (c1) the computing device creating or supporting other device to create information on transfoiriiation of the individual fields of the unstructured data to a respective desired format for each of the individual fields by referring to the names of the items and the data types by:
      (c2) the computing device creating or supporting other device to create candidates of the information on transformation by referring to the names of items and the types of data and displaying or supporting other device to display the created candidates to a user;
      (c3) the computing device, if the information on the transformation is detected to be selected among the created candidates, transforming or supporting other device to transform the unstructured data by referring to the information on the transformation; and (d) the computing device creating or supporting other device to create a program code for the normalization based on the information on the transformation; and (e) the computing device delivering the created code to a database; and instructing the database to store the created code and to normalize or support a server connected with the database to normalize at least one of the unstructured data according to the created code.

2. The method of claim 1, wherein, at the step of (a), the computing device further performs a process of displaying or supporting other device to display to a user a state of the unstructured data being separated as a result of the parsing.

3. The method of claim 1, wherein, at the step of (a), when it is detected that the at least some unstructured data correspond to the predefined format, the computing device determines or supports other device to determine the parsing rule based on the corresponding format and parses or supports other device to parse the at least some unstructured data under the determined parsing rule to extract the individual fields.

4. The method of claim 1, wherein the parsing rule is expressed as a separator or a regular expression.

5. The method of claim 4, wherein the separator or the regular expression is defined by the user.

6. The method of claim 1, wherein the process of determining the rule includes calculating statistics of special characters from a result of splitting at least some character strings of the unstructured data by a certain unit of length and determining a separator to be included in the parsing rule based on the statistics.

7. The method of claim 6, wherein the statistics of the special characters include at least one of a degree of distribution and frequency of the special characters, and at least one of special characters with a highest statistical value is determined as the separator.

8. The method of claim 1, wherein, if at least one character string included in the unstructured data is X0 and if total n results which represent results of separating the character string by a separator are Xk (k=1, 2, ..., n), the process of determining the rule includes: (i) applying individual regular expressions to individual Xi (i=0, 1, ..., n), the individual regular expressions belonging to a regular expression set by item names which is a set of predefined regular expressions corresponding to predefined names of items and (ii) determining at least one specific regular expression corresponding to at least one of the Xi as a regular expression included in the parsing rule by referring to a matched result acquired by the process of (i).

9. The method of claim 1, wherein the predefined format includes at least one of JSON, CEF, Key & Value, and CSV.

10. The method of claim 1, wherein, at the step of (b), at least either of the names of items corresponding to the individual fields and data types corresponding to the individual fields are selected by the user.

11. The method of claim 1, wherein the server is at least one clustered machine.

12. The method of claim 1, wherein the computing device gives notification to the server that the created code has been delivered to the database.

13. The method of claim 1, wherein the information on transformation includes at least one piece of transformation option information and transformation function information.

14. The method of claim 13, wherein a function selectable as the transformation function information includes: at least one of set( ) as a function of setting a random value, replace( ) as a function of replacing a normal character string, replaceAll( ) as a function of replacing character strings by using regular expressions, replaceGet( ) as a function of extracting a character string by using a regular expression, substr( ) as a function of extracting some character strings, date( ) as a function of transforming a date format, hexToString( ) as a function of converting a hexadecimal character string to a normal character string, stringToMD5( ) as a function of hashing a character string by using md5, unixTimestamp( ) as a function of converting Unix date format, decodeBase64( ) as a function of decoding a Base64 character string to a normal character string, longToIP( ) as a function of converting a long type value to an IP (Internet protocol) address, toLowerCase( ) as a function of changing an upper case letter included in a character string to a lower case letter, and trim( ) as a function of removing leading and trailing spaces of a character string.

15. The method of claim 1, wherein the unstructured data include at least either of text data and binary data.

16. A method for performing normalization of at least one piece of unstructured data, comprising steps of:

(a) a computing device determining whether a predetermined parsing rule is applicable to at least some of the unstructured data;

(a1) where the predetermined parsing rule is determined to be applicable to at least some of the unstructured data, the computing device parsing or supporting other device to parse at least some unstructured data under the predetermined parsing rule to extract individual fields;

(a2) where the predetermined parsing rule is determined not to be applicable to at least some of the unstructured data, the computing device performs or supports other device to perform a process of determining a new parsing rule by referring to the unstructured data, and parses or supports other device to parse the at least some unstructured data under the new parsing rule to extract the individual fields;

(b) the computing device selecting or supporting other device to select names of items corresponding to individual fields extracted from the unstructured data, and verifying or supporting other device to verify a validity of data types corresponding to the individual fields, wherein (b1) when at least some unstructured data are parsed as individual fields under the predetermined parsing rule, and when a desired format includes a field name corresponding to at least one field among the parsed fields, the computing device selects or supports other device to select a name of an item of the at least one field by referring to the field name;

(c1) the computing device creating or supporting other device to create information on transformation of the individual fields of the unstructured data to respective of the desired formats for each of the individual fields by referring to the names of the items and the data types by:

(c2) the computing device creating or supporting other device to create candidates of the information on transformation by referring to the names of items and the types of data and displaying or supporting other device to display the created candidates to a user;

(c3) the computing device, if the information on the transformation is detected to be selected among the created candidates, transforming or supporting other device to transform the unstructured data by referring to the information on the transformation; and (d) the computing device creating or supporting other device to create a program code for the normalization based on the information on the transformation; and (e) the computing device delivering the created code to a database; and instructing the database to store the created code and to normalize or support a server connected with the database to normalize at least one of the unstructured data according to the created code.

17. A method for performing normalization of at least one piece of unstructured data, comprising steps of:

(a) a computing device determining whether a predetermined parsing rule is applicable to at least some of the unstructured data;

(a1) where the predetermined parsing rule is determined to be applicable to at least some of the unstructured data, the computing device parsing or supporting other device to parse at least some unstructured data under the predetermined parsing rule to extract individual fields;

(a2) where the predetermined parsing rule is determined not to be applicable to at least some of the unstructured data, the computing device performs or supports other device to perform a process of determining a new parsing rule by referring to the unstructured data, and parses or supports other device to parse the at least some unstructured data under the new parsing rule to extract the individual fields;

(b) the computing device selecting or supporting other device to select names of items corresponding to individual fields extracted from the unstructured data, and verifying or supporting other device to verify a validity of data types corresponding to the individual fields, wherein:

(b1) when at least some unstructured data are parsed as individual fields under the predetermined parsing rule, and when at least one of said individual fields include a regular expression belonging to a set of regular expressions by item names, the computing device selects or supports other device to select a name of an item corresponding to the set of regular expressions by item names;

(c1) the computing device creating or supporting other device to create information on transformation of the individual fields of the unstructured data to respective of the desired formats for each of the individual fields by referring to the names of the items and the data types by:

(c2) the computing device creating or supporting other device to create candidates of the information on transformation by referring to the names of items and the types of data and displaying or supporting other device to display the created candidates to a user;

(c3) the computing device, if the information on the transformation is detected to be selected among the created candidates, transforming or supporting other device to transform the unstructured data by referring to the information on the transformation;

(d) the computing device creating or supporting other device to create a program code for the normalization based on the information on the transformation; and (e) the computing device delivering the created code to a database; and instructing the database to store the created code and to normalize or support a server connected with the database to normalize at least one of the unstructured data according to the created code.

18. A method for performing normalization of at least one piece of unstructured data, comprising steps of:

(a) a computing device determining whether a predetermined parsing rule is applicable to at least some of the unstructured data;

(a1) where the predetermined parsing rule is determined to be applicable to at least some of the unstructured data, the computing device parsing or supporting other device to parse at least some unstructured data under the predetermined parsing rule to extract individual fields;

(a2) where the predetermined parsing rule is determined not to be applicable to at least some of the unstructured data, the computing device performs or supports other device to perform a process of determining a new parsing rule by referring to the unstructured data, and parses or supports other device to parse the at least some unstructured data under the new parsing rule to extract the individual fields;

(b1) the computing device selecting or supporting other device to select names of items corresponding to individual fields extracted from the unstructured data, (b2) upon selection of specific names of items corresponding to the individual fields, the computing device deciding or supporting other device to decide whether values of the individual fields correspond to individual data types belonging to a list of data types, (b3) the computing device verifying or supporting other device to verify a validity of data types corresponding to the individual fields and whether the identified data types and the names of items corresponding to the individual fields are valid;

(c1) the computing device creating or supporting other device to create information on transformation of the individual fields of the unstructured data to respective of the desired formats for each of the individual fields by referring to the names of the items and the data types by:

(c2) the computing device creating or supporting other device to create candidates of the information on transformation by referring to the names of items and the types of data and displaying or supporting other device to display the created candidates to a user;

(c3) the computing device, if the information on the transformation is detected to be selected among the created candidates, transforming or supporting other device to transform the unstructured data by referring to the information on the transformation;

(d) the computing device creating or supporting other device to create a program code for the normalization based on the information on the transformation;

(e) the computing device delivering the created code to a database; and instructing the database to store the created code and to normalize or support a server connected with the database to normalize at least one of the unstructured data according to the created code.

19. The method of claim 18, wherein the list of data types is a predefined list according to the names of items corresponding to the individual fields.

20. The method of claim 18, wherein, if the names of items corresponding to the individual fields are selected by referring to field names included in the predefined format, the list of data types is a predefined list according to the predefined format and the field names.

21. A computing device for performing normalization of at least one piece of unstructured data, comprising:
   a communication part for acquiring the unstructured data; and
   a processor for:
   (i) determining whether a predetermined parsing rule is applicable to at least some of the unstructured data,
      (i-a) where the predetermined parsing rule is determined to be applicable to at least some of the unstructured data, the processor parsing or supporting other device to parse at least some unstructured data under the parsing rule to extract individual fields,
      (i-b) where the predetermined parsing rule is determined not to be applicable to at least some of the unstructured data, the processor performs or supports other device to perform a process of determining a new parsing rule by referring to the unstructured data, and parses or supports other device to parse the at least some unstructured data under the new parsing rule to extract the individual fields;
   (ii) selecting or supporting other device to select names of items corresponding to individual fields extracted from the unstructured data through the parsing and verifying or supporting other device to verify a validity of data types corresponding to the individual fields,
   (iii-a) creating or supporting other device to create information on transformation of the individual fields of the unstructured data to a respective desired format for each of the individual fields by referring to the names of the items and the data types by:
      (iii-b) when the information on the transformation is detected to be selected among the created candidates, transforming or supporting other device to transform the unstructured data by referring to the information on the transformation;
      (iii-c) when the information on the transformation is detected to be selected among the created candidates, transforming or supporting other device to transfoun the unstructured data by referring to the information on the transfoiination;
   (iv) creating or supporting other device to create a code for the normalization based on the information on the transformation,
   (v) delivering the created code to a database; and instructing the database to store the created code and to normalize or support a server connected with the database to normalize at least one of the unstructured data according to the created code.

22. The computing device of claim 21, wherein the processor further performs a process of displaying or supporting other device to display to a user a state of the unstructured data being separated as a result of the parsing.

23. The computing device of claim 21, wherein, if the at least some unstructured data are detected as corresponding to a predefined format, the processor determines or supports other device to determine the parsing rule based on the corresponding format and parses or supports other device to parse the at least some unstructured data under the deteimined parsing rule to extract the individual fields.

24. The computing device of claim 21, wherein the parsing rule is expressed as a separator or a regular expression.

25. The computing device of claim 24, wherein the separator or the regular expression is defined by the user.

26. The computing device of claim 21, wherein the process of determining the rule includes calculating statistics of special characters from a result of splitting at least some character strings of the unstructured data by a certain unit of length and determining a separator to be included in the parsing rule based on the statistics.

27. The computing device of claim 26, wherein the statistics of the special characters include at least one of a degree of distribution and frequency of the special characters, and at least one of special characters with a highest statistical value is determined as the separator.

28. The computing device of claim 21, wherein, if at least one character string included in the unstructured data is X0 and if total n results which represent results of separating the character string by a separator are Xk (k=1, 2, . . . , n), the process of determining the rule includes: (i) applying individual regular expressions to individual Xi (i=0, 1, . . . , n), the individual regular expressions belonging to a regular expression set by item names which is a set of predefined regular expressions corresponding to predefined names of items and (ii) determining at least one specific regular expression corresponding to at least one of the Xi as a regular expression included in the parsing rule by referring to a matched result acquired by the process of (i).

29. The computing device of claim 21, wherein the predefined format includes at least one of JSON, CEF, Key & Value, and CSV.

30. The computing device of claim 21, wherein at least either of the names of items corresponding to the individual fields and data types corresponding to the individual fields are selected by the user.

31. A computing device for performing normalization of at least one piece of unstructured data, comprising:
   a communication part for acquiring the unstructured data; and
   a processor for
   (i) determining whether a predetermined parsing rule is applicable to at least some of the unstructured data,
      (i-a) where the predetermined parsing rule is determined to be applicable to at least some of the unstructured data, the processor parsing or supporting other device to parse at least some unstructured data under the parsing rule to extract individual fields,
      (i-b) where the predetermined parsing rule is determined not to be applicable to at least some of the unstructured data, the processor performs or supports other device to perform a process of determining a new parsing rule by referring to the unstructured data, and parses or supports other device to parse the at least some unstructured data under the new parsing rule to extract the individual fields;
   (ii) selecting or supporting other device to select names of items corresponding to individual fields extracted from the unstructured data, and verifying or supporting other device to verify a validity of data types corresponding to the individual fields, wherein:
      (ii-a) when at least some unstructured data are parsed as individual fields under the predetermined parsing rule, and when a desired format includes a field name corresponding to at least one field among the parsed fields, selecting or supports other device to select a name of an item of the at least one field by referring to the field name;
   (iii-a) creating or supporting other device to create information on transformation of the individual fields of the unstructured data to a respective desired format for each of the individual fields by referring to the names of the items and the data types by:
(iii-b) when the information on the transformation is detected to be selected among the created candidates, transforming or supporting other device to transform the unstructured data by referring to the information on the transformation;
(iii-c) when the information on the transformation is detected to be selected among the created candidates, transforming or supporting other device to transform the unstructured data by referring to the information on the transformation;
(iv) creating or supporting other device to create a code for the normalization based on the information on the transformation,
(v) delivering the created code to a database; and instructing the database to store the created code and to normalize or support a server connected with the database to normalize at least one of the unstructured data according to the created code.

32. A computing device for performing normalization of at least one piece of unstructured data, comprising:
a communication part for acquiring the unstructured data; and
a processor for
(i) determining whether a predetermined parsing rule is applicable to at least some of the unstructured data,
(i-a) where the predetermined parsing rule is determined to be applicable to at least some of the unstructured data, the processor parsing or supporting other device to parse at least some unstructured data under the parsing rule to extract individual fields,
(i-b) where the predetermined parsing rule is determined not to be applicable to at least some of the unstructured data, the processor performs or supports other device to perform a process of determining a new parsing rule by referring to the unstructured data, and parses or supports other device to parse the at least some unstructured data under the new parsing rule to extract the individual fields;
(ii) selecting or supporting other device to select names of items corresponding to individual fields extracted from the unstructured data, and verifying or supporting other device to verify a validity of data types corresponding to the individual fields, wherein:
(ii-a) when at least some unstructured data are parsed as individual fields under the predetermined parsing rule, and when at least one of said individual fields include a regular expression belonging to a set of regular expressions by item names, selecting or supporting other device to select a name of an item corresponding to the set of regular expressions by item names;
(iii-a) creating or supporting other device to create information on transformation of the individual fields of the unstructured data to a respective desired format for each of the individual fields by referring to the names of the items and the data types by:
(iii-b) when the information on the transformation is detected to be selected among the created candidates, transforming or supporting other device to transform the unstructured data by referring to the information on the transformation;
(iii-c) when the information on the transformation is detected to be selected among the created candidates, transforming or supporting other device to transform the unstructured data by referring to the information on the transformation;
(iv) creating or supporting other device to create a code for the normalization based on the information on the transformation,
(v) delivering the created code to a database; and instructing the database to store the created code and to normalize or support a server connected with the database to normalize at least one of the unstructured data according to the created code.

33. A computing device for performing normalization of at least one piece of unstructured data, comprising:
a communication part for acquiring the unstructured data; and
a processor for
(i) determining whether a predetermined parsing rule is applicable to at least some of the unstructured data,
(i-a) where the predetermined parsing rule is determined to be applicable to at least some of the unstructured data, the processor parsing or supporting other device to parse at least some unstructured data under the parsing rule to extract individual fields,
(i-b) where the predetermined parsing rule is determined not to be applicable to at least some of the unstructured data, the processor performs or supports other device to perform a process of determining a new parsing rule by referring to the unstructured data, and parses or supports other device to parse the at least some unstructured data under the new parsing rule to extract the individual fields;
(ii-a) selecting or supporting other device to select names of items corresponding to individual fields extracted from the unstructured data;
(ii-b) upon selection of specific names of items corresponding to the individual fields, deciding or supporting other device to decide whether values of the individual fields correspond to individual data types belonging to a list of data types,
(ii-c) verifying or supporting other device to verify a validity of data types corresponding to the individual fields and whether the identified data types and the names of items corresponding to the individual fields are valid,
(iii-a) creating or supporting other device to create information on transformation of the individual fields of the unstructured data to a respective desired format for each of the individual fields by referring to the names of the items and the data types by:
(iii-b) when the information on the transformation is detected to be selected among the created candidates, transforming or supporting other device to transform the unstructured data by referring to the information on the transformation;
(iii-c) when the information on the transformation is detected to be selected among the created candidates, transforming or supporting other device to transform the unstructured data by referring to the information on the transformation;
(iv) creating or supporting other device to create a code for the normalization based on the information on the transformation, (v) delivering the created code to a database; and instructing the database to store the created code and to normalize or support a server connected with the database to normalize at least one of the unstructured data according to the created code.

34. The computing device of claim 33, wherein the list of data types is a predefined list according to the names of items corresponding to the individual fields.

35. The computing device of claim 33, wherein, if the names of items corresponding to the individual fields are selected by referring to field names included in the predefined format, the list of data types is a predefined list according to the predefined format and the field names.

\* \* \* \* \*